United States Patent [19]

Ikegaya

[11] Patent Number: 4,904,529

[45] Date of Patent: Feb. 27, 1990

[54] HEAT AND OIL RESISTANT INSULATING COMPOSITION

[75] Inventor: Norio Ikegaya, Shizuoka, Japan

[73] Assignee: Kurabe Industrial Co., Ltd., Shizuoka, Japan

[21] Appl. No.: 220,351

[22] Filed: Jul. 15, 1988

Related U.S. Application Data

[62] Division of Ser. No. 14,798, Feb. 13, 1987, abandoned.

[30] Foreign Application Priority Data

| Feb. 18, 1986 | [JP] | Japan | 61-34450 |
| Feb. 18, 1986 | [JP] | Japan | 61-34452 |
| Feb. 18, 1986 | [JP] | Japan | 61-34454 |

[51] Int. Cl.⁴ ............... C08L 51/00; B32B 27/28; B32B 15/08
[52] U.S. Cl. .................. 428/377; 428/75; 428/378; 428/379; 525/104; 525/276
[58] Field of Search ............ 428/379, 377, 375; 525/276, 104

[56] References Cited

U.S. PATENT DOCUMENTS

| 3,894,118 | 7/1975 | Aranoff et al. | 525/276 |
| 4,028,431 | 6/1977 | Futami et al. | 525/104 |
| 4,031,167 | 6/1977 | Aronoff et al. | 525/276 |
| 4,201,698 | 5/1980 | Itoh et al. | 525/104 |
| 4,530,970 | 7/1985 | Morozumi et al. | 525/193 |
| 4,530,971 | 7/1985 | Geri et al. | 525/199 |

FOREIGN PATENT DOCUMENTS

| 54-135959 | 10/1979 | Japan | 525/276 |
| 56-5852 | 1/1981 | Japan | 525/104 |
| 56-50948 | 5/1981 | Japan | 525/104 |
| 60-058455A | 4/1985 | Japan | 525/104 |

OTHER PUBLICATIONS

Dennis Hull, Xenox Inc., "Aflas Elastomer-A New, Different Type Fluoroelastomer from Japan", RPN Technical Notebook-9/81.

*Primary Examiner*—Carman J. Seccuro
*Attorney, Agent, or Firm*—Martin A. Farber

[57] ABSTRACT

A heat and oil resistant insulating composition for use as an insulating layer of an electric insulating wire, a material for an extrusion mold and an insulating layer of a cord-shaped heater, comprising an ethylene tetrafluoride-propylene copolymer, a methacrylic ester or acrylic ester as a cross-linking auxiliary and an organic peroxide as a cross-linking agent.

The composition is cross-linked under the atmospheric pressure.

4 Claims, No Drawings

HEAT AND OIL RESISTANT INSULATING COMPOSITION

RELATED APPLICATION

This application is a division of application Ser. No.: 014,798 Filed: Feb. 13, 1987, now abandoned.

BACKGROUND OF THE INVENTION

1. Field of the Invention

The present invention relates to a heat and oil resistant insulating composition used as a material for insulating layer of an electric insulating wire, an extrusion mold and a cord-shaped heater, and more particularly, to an insulating composition possible of cross-linking under the atmospheric pressure.

2. Description of the Prior Art

There are conventionally known insulating compositions excellent in heat and oil resistant property and electric characteristics, comprising an ethylene tetrafluoride-propylene copolymer, an allyl compound as a cross-linking auxiliary and an organic peroxide as a cross-linking agent.

These compositions are used as materials for an insulating layer of an electric insulating wire which is made of a conductor (stranded wire assembly) coated with the insulating layer, and the wire obtained is being utilized as a lead wire of automobiles, machine tools, motors etc., due to high heat and oil resistance, electric characteristics thereof. The composition is extruded and coated on the conductor, and then cross-linked by heating under the high pressure with pressurized vapor or liquid for preventing the occurence of the voids therein or it is extruded and coated on the conductor, and cross-linked by heating under the atmospheric pressure, after being sucked in vacuum to eliminate moisture or gas therein.

With such former process, however, the composition is intruded into spaces of the stranded wire assembly (conductor) due to the high pressure, and kept in the spaces as a rubber after the cross linking, when the coat is removed from the assembley.

Moreover, with the latter process, however, various disadvantages are encountered: it takes long time for the preparation of the production, different from the conventional extruder, the vacuum pump in the extruder must be contineously kept into a necessary vacuum degree, the vent-type extruder is high cost and requires wide places since it involves large-size cylinder and vacuum pump.

Furthermore, these compositions are used as materials for extrusion molds, such as tubes, packings, etc., which are required to hold high heat and oil resistance. The composition is cross-linked with the same steps as mentioned above.

With such conventional process, however, various disadvantages are encountered; with the former process, the production rate becomes low inspite of the increase of production steps due to the batch-type cross-linking, it requires a boiler for producing pressurized vapor, etc., and with the latter process, it contains some disadvantages as mentioned above.

Moreover, these compositions are used as materials for cord-shaped heaters which is composed of a glass fiber cord as a core, a metal resistance wire spirally wound on the core and insulating layer coated on the wire. The cord-shaped heater is being utilized in a compressor crank case of a refrigerating machine, pipeline, etc., due to excellent electric characteristics, high heat and oil resistance. The composition is cross-linked with the same steps as mentioned above.

With such conventional process, however, various disadvantages which are same as mentioned above are encountered.

SUMARY OF THE INVENTION

It is an object of the present invention to provide a heat and oil resistant insulating composition wherein the disadvantages found in the prior are overcome.

It is another object of the present invention to provide such an insulating composition wherein the cross-linkig is possible under the atmospheric pressure.

According to the present invention, the above objects are accomplished by providing a heat and oil resistant insulating composition, comprising an ethylene tetrafluoride-propylene copolymer, a methacrylic ester or acrylie ester as a cross-linking auxiliary and an organic peroxide as a cross-linking agent, thereby being cross-linked under the atmospheric pressure.

In the afore-mentioned composition, a silicone rubber may be comprised in an amount below 200 parts by weights to 100 parts by weight of the ethylene tetrafluoride-propylene copolymer.

It is usual in the conventional composition that the ethylene tetrafluoride-propyleene copolymer is cross-linked with allyl compounds as a cross-linking auxiliary and organic peroxides as a cross-linking agent.

On the other hand, however, it is characteristic in the present invention that the ethylene tetrafluoride-propylene copolymer is cross-linked in the presence of methacrylic esters or acrylic esters as a cross-linking auxiliary and organic peroxide as a cross-linking agent.

The composition of the present invention can be cross-linked at a temperature of 80° to 100° C. under the atmospheric pressure without voids therein even though vent-type extruder is not used.

In the present invention, if allyl compounds, oxime compounds, or sulphur or maleimide compounds are used as a cross-linking auxiliary instead of methacrylic esters or acrylic ester, if methacrylic esters or acrylic are used alone without organ peroxides, or if the cross-linking agent is used alone, the composition cannot be cross-linked at a temperature of 80° to 100° C. even though it is kept standing for several ten minutes. In this case, if the composition is cross-linked at a temperature of 150° to 200° C. under the atmosheric pressure, voids appear therein.

The methacrylic esters or acrylic esters as described above are trimethylolpropane trimethacrylate, ethylene-di-methacrylate, polyethyleneglycol di-methacrylate, cyclohexyl methacrylate, di-alkylaminoalkyl methacrylate, aluminum methacrylate, aluminum acrylate, zinc methacrylate, zinc acrylate, etc., which may be employed alone or in a mixture of two or more thereof.

Illustrative of organic peroxides as described above are various kinds of peroxide compounds which are conventionally used, such as 2,5-dimethyl-2,5-di(benzoil peroxy) hexane, and the like.

The afore-mentioned cross-linking agents and auxiliarys of the present invention may be comprised in the composition in an optional amount to be desired to the amount of ethylene tetrafluoride-propylene copolymer. But, the amount of silicone rubber should be below 200 parts by weight to 100 parts by weight of the ethlene tetrafluoride-propylene copolymer. The amount of silicone rubber exceeding 200 parts by weight causes a reduction in oil resistance and solvent-proof property, resulting in loss of utilization for the electric insulating wire, extrusion molds and cord-shaped heaters.

Illustrative of silicone rubbers as described above are ferrosilicone rubbers, methylphenyl silicone rubbers, methylphenyl vinyl silicone rubbers, dimethyl silicone rubbers, methylvinyl silicone rubbers, or the like.

It should be noted that those may be used as a silicone rubber, which contain a filler in an amount of 30 to 100 parts by weight of silicone rubber and which are commercially available in the form of a silicone rubber compound.

In the present invention, additives which are commonly used as rubber compounding ingredients may be also added as required, such as fillers, reinforcing agents, stabilizers, softeners, pigments and the like.

The afore-mentioned composition of the present invention is heated and cross-linked in a heating furnace of 200° C. under the atmospheric pressure for about 5 minutes.

The head and cylinder of the extruder to be used are kept at a temperature of 50° C. considering that the composition is cross-linked at a temperature of 80° C.

EXAMPLES

Examples 1 to 4 and Comparative Examples 1 to 5

Each of mixtrures having composition of composition No. 1 to 4 and Comparative composition 1 to 4 given in Table 1 was intactly extruded into a thickness of 0.8 mm onto a tin-plated, annealed copper stranded wire assembly having a nominal sectional area of 0.75 $mm^2$ to coat the stranded wire assembly therewith and then, the coating was heatd and cross-linked for five minutes in a heating furnace of 200° C. under the atmospheric pressure to give an electric insulating wire.

The cylinder and head of the extruder were kept at a temperature of 50° C. at this time.

Moreover, a mixture of Comparative composition No. 5 given in Table 1 was intactly extruded into a thickness of 0.8 mm onto a tin-plated, annealed copper stranded wire assembly having a nominal sectional area of 0.75 $mm^2$ to coat the stranded wire assembly therewith and then the coating was heated and cross-linked for five minutes by use of steam under high pressure of 14 $kgf/cm^2$ to given an electric insulating wire.

The cylinder and head of the extruder was kept at 50° C. at this time.

The results of the tests in Example 1 to 4 and Comparative Examples 1 to 5 are givn in Table 2.

TABLE 1

| | Composition No. | | | | Comparative Composition No. (parts by weight) | | | | |
|---|---|---|---|---|---|---|---|---|---|
| Component | 1 | 2 | 3 | 4 | 1 | 2 | 3 | 4 | 5 |
| Ethylene tetrafluoride-propylene copolymer | 100 | 100 | 100 | 100 | 100 | 100 | 100 | 100 | 100 |
| Silicone rubber | — | — | 40 | 150 | — | — | — | 250 | — |
| Sodium stearate (lubricant) | 1 | 1 | 1 | 1 | 1 | 1 | 1 | 1 | 1 |
| Filler(silicates) | 50 | 50 | 50 | 50 | 50 | 50 | 50 | 50 | 50 |
| softener(silicone oil) | 4 | 4 | — | — | 4 | 4 | 4 | — | 4 |
| Cross-linking agent of ethylene tetrafluoride-propylene copolymer(1) | 3 | 3 | 3 | 3 | 3 | 3 | 3 | 3 | 3 |
| Cross-linking agent of silicone rubber(2) | — | — | 0.8 | 3 | — | — | — | 5 | — |
| Cross-linking auxiliary | | | | | | | | | |
| Methacrylic ester(3) | 6 | — | 6 | 6 | — | — | — | 6 | — |
| Acrylic ester(4) | — | 6 | — | — | — | — | — | — | — |
| Allyl compound(5) | — | — | — | — | 6 | — | — | — | 6 |
| Oxime compound(6) | — | — | — | — | — | 6 | — | — | — |
| Maleimide compound | — | — | — | — | — | — | 6 | — | — |

*(1)2.5-dimethyl-2.5-di(benzoil peroxy) hexane
(2)2.4-dichlorozenzoil peroxide
(3)Trimethylol propane trimethacrylate
(4)ethylene dimethacrylate
(5)triallyl isocyanurate
(6)P,P'—dibenzoil quinone dioxime
(7)N,N'—m-phenylene dimaleimide
Each of the amounts of cross-linking agents in Examples 3 and 4, and Comparative Example 4 is comparative along with the ratio of ethylene tetrafluoride-propylene copolymer and silicone rubber.

TABLE 2

| Characteristics | Example No. | | | | Comparative Example No. | | | | | Testing method |
|---|---|---|---|---|---|---|---|---|---|---|
| | 1 | 2 | 3 | 4 | 1 | 2 | 3 | 4 | 5 | |
| Intrusion of rubber into spaces | NONE | NONE | NONE | NONE | NONE FOUND | NONE FOUND | NONE FOUND | NONE | FOUND | Observation through eyes |
| Voids in samples | NONE | NONE | NONE | NONE | FOUND | FOUND | FOUND | NONE | NONE | Observation through eyes |
| Tensil strength of insulator ($kgf/cm^2$) | 0.85 | 0.77 | 0.82 | 0.79 | * | * | * | 0.30 | 0.92 | JIS C 2004 (Note 1) |
| Elongation of insulator (%) | 220 | 260 | 210 | 205 | * | * | * | 240 | 220 | JIS C 2004 (Note 1) |
| Heat resistance | | | | | | | | | | |
| Tensil strength | | | | | | | | | | |

TABLE 2-continued

| Characteristics | Example No. | | | | Comparative Example No. | | | | | Testing method |
|---|---|---|---|---|---|---|---|---|---|---|
| | 1 | 2 | 3 | 4 | 1 | 2 | 3 | 4 | 5 | |
| retension (%) | 117 | 129 | 120 | 127 | * | * | * | 94 | 109 | JIS C 3004 (Note 1) |
| Elongation retention (%) | 80 | 72 | 70 | 70 | * | * | * | 75 | 84 | 220° C. × 96 H |
| Solvent resistance (% variation in outer diameter) | +8 | +9 | +12 | +21 | * | * | * | +38 | +8 | Fuel oil C normal temp. 48 H |

*Test is imposible since the samples are not obtained.

Note 1: Tensile strength and elongation (JIS C 3004).

An tubular sample having a length of about 150 mm was cut from the finished article, and mark lines were taken down on the central portion of the sample at a distance of 50 mm. The sample was tensioned at a rate of 500 mm/min to determine the maximum tensile load and the length between the mark lines at breaking and to calculate the tensile strength and % elongation per cm².

As apparent from Table 2, there are no voids in Examples 1 to 4 even though they are cross-linked by heating at the atmospheric pressure, and there are no intrusions into spaces of stranded wire assembly, due to the atmospheric pressure, thereby obtaining excellent insulating wire having no residues of rubber in the spaces after the removal of the insulating layer.

On the other hand, however, there are many voids in Comparative Examples 1 to 3 which are useless as the insulating wire.

Moreover, in Comparative Examples 5, there are intrusions into spaces of stranded wire assembly, due to the high pressure in accordance with the steam, thereby obtaining insulating wire having residues of rubber in the space after the removal of the insulating layer.

Furthermore, in Examples 3 and 4, ther are less reduction of solvent proof property due to the amount of solicone rubber below 200 parts by weight to 100 parts of ethylene tetrafluoride-propylene copolymer. On the other hand, however, in Comparative Example 4, there are much reduction of solvent proof property due to the amount of silicone rubber exceeding 200 parts.

Examples 5 to 8 and Comparative Examples 6 to 9

Each of the mixtures having compositions given in Table 1 (except Comparative Composition 5) were extruded into a tube in a thickness of 0.8 mmm and inner diameter of 2 mm, and after then, were heated and cross-linked in a heating furnace of 200° C. for five minutes to give examples 5 to 8 and comparative examples 6 to 9.

The cylinder and head of the extruder was kept at 50° C. at this time.

The results of tests in examples 5 to 8 and comparative examples 6 to 9 are given in Table 3.

TABLE 3

| Characteristics | Example No. | | | | Comparative Example No. | | | | Testing method |
|---|---|---|---|---|---|---|---|---|---|
| | 5 | 6 | 7 | 8 | 6 | 7 | 8 | 9 | |
| Voids in samples | NONE | NONE | NONE | NONE | FOUND | FOUND | FOUND | NONE | Observation through eyes |
| Tensil strength (kgf/cm²) | 0.83 | 0.81 | 0.80 | 0.77 | * | * | * | 0.73 | JIS C 3004 (Note 1) |
| Elongation (%) | 225 | 250 | 210 | 210 | * | * | * | 255 | JIS C 3004 (Note 1) |
| Heat resistance | | | | | | | | | |
| Tensil strength retention (%) | 119 | 118 | 122 | 124 | * | * | * | 90 | JIS C 3004 (Note 1) |
| Elongation retention (%) | 82 | 71 | 72 | 70 | * | * | * | 73 | 220° C. × 96 H |
| Solvent resistance (% variation in outer diameter) | +35 | +40 | +59 | +88 | * | * | * | +172 | Fuel oil C at normal temp. 48 H |

*Test is impossible since the samples are not obtained.

As apparent from Table 3 there are no voids in Examples 5 to 8 even though they are cross-linked under the atmospheric pressure.

On the other hand, however, there are many voids in Comparative Examples 6 to 8 which are imposible to use as the tubes.

Furthermore, in Examples 7 and 8, ther are less reduction of solvent proof property due to the amount of silicone rubber below 200 parts by weight to 100 parts by weight of ethylene tetrafluoride-propylene copolymer. On the other hand, however, in Comparative Example 9, there are much reduction of solvent proof property due to the amount of silicone rubber exceeding 200 parts.

Examples 9 to 12 and Comparative Examples 10 to 13

Each of the mixtures having compositions given in Table 1 (except Comparative Composition 5) was intactedly extruded into a thickness of 0.8 mm onto a cord-shaped heater assembly composed of a metal resistance wire having 0.18 mm outer diameter, spirally wound on glass fibre cord having about 1.0 mm outer diameter to coat the cord-shaped heater assembly therewith and then, the coating was heated and cross-linked for five minutes in a heating furnace of 200° C. under the atmospheripressure to give cord-shaped heater. (Examples 9 to 12 and comparative Examples 10 to 13.) The cylinder and head of the extruder were kept at 50° C. at this time.

The results of test in examples 9 to 12 and comparative examples 10 to 13 are given in Table 4.

TABLE 4

| Characteristics | Example No. 9 | 10 | 11 | 12 | Comparative Example No. 10 | 11 | 12 | 13 | Testing method |
|---|---|---|---|---|---|---|---|---|---|
| Voids in samples | NONE | NONE | NONE | NONE | FOUND | FOUND | FOUND | NONE | Observation through eyes |
| Tensil strength of insulator (kgf/cm$^2$) | 0.88 | 0.80 | 0.79 | 0.76 | * | * | * | 0.77 | JIS C 3004 (Note 1) |
| Elongation of insulator (%) | 230 | 255 | 215 | 205 | * | * | * | 225 | JIS C 3004 (Note 1) |
| Heat resistance | | | | | | | | | |
| Tensil strength retension (%) | 111 | 118 | 123 | 130 | * | * | * | 99 | JIS C 3004 (Note 1) |
| Elongation retention (%) | 78 | 72 | 70 | 72 | * | * | * | 72 | 220° C. × 96 H |
| Solvent resistance (% variation in outer diameter) | +8 | +8 | +11 | +23 | * | * | * | +39 | Fuel oil C at normal temp. 48 H |

*Test is impossible since the samples are not obtained.

As apparent from Table 4, there are no voids in Examples 9 to 12 even though they are cross-linked under the atmospheric pressure.

On the other hand, however, there are many voids in Comparative Examples 10 to 12 which are useless as the cord shaped heater.

Furthermore, in Examples 11 and 12, ther are less reduction of solvent proof property due to the amount of silicone rubber below 200 parts by weight to 100 parts of ethylene tetrafluoride-propylene copolymer. On the other hand, however, in Comparative Example 13, there are much reduction of solvent proof property due to the amount of silicone rubber exceeding 200 parts.

What is claimed is:

1. A coated wire in which a mixture is extruded onto a stranded wire assembly to coat the assembly therewith, and the coating being heated and cross-linked to provide an electric insulating wire, said mixture having a composition comprising an ethylene tetrafluoride-propylene copolymer, a multi-functional methacrylic ester or acrylic ester as a cross-linking auxiliary and an organic peroxide as a cross-linking agent, thereby being cross-linked under the atmospheric pressure.

2. A coated wire according to claim 1, wherein
said composition furthermore comprises a silicone rubber in an amount below 200 parts by weight to 100 parts by weight of the ethylene tetrafluoride-propylene copolymer.

3. A coated cord-shaped heater assembly in which a mixture is extruded onto a cord-shaped heater assembly composed of a metal resistance wire spirally wound on glass fibre cord to coat the assembly therewith, and the coating being heated and cross-linked to provide the coated cord-shaped heater assembly, said mixture having a composition comprising an ethylene tetrafluoride-propylene copolymer, a multi-functional methacrylic ester or acrylic esters as a cross-linking auxiliary and an organic peroxide as a cross-linking agent, thereby being cross-linked under the atmospheric pressure.

4. A coated cord-shaped heater assembly according to claim 3, wherein
said composition furthermore comprises a silicone rubber in an amount below 200 parts by weight to 100 parts by weight of the ethylene tetrafluoride-propylene copolymer.

* * * * *